United States Patent [19]

Mattes et al.

[11] Patent Number: 5,129,673
[45] Date of Patent: Jul. 14, 1992

[54] ELECTRONIC DEVICE

[75] Inventors: Bernhard Mattes, Sachsenheim; Hartmut Schumacher, Freiberg a.N., both of Fed. Rep. of Germany

[73] Assignee: Robert Bosch GmbH, Stuttgart, Fed. Rep. of Germany

[21] Appl. No.: 540,940

[22] PCT Filed: Jan. 20, 1989

[86] PCT No.: PCT/DE89/00027
§ 371 Date: May 24, 1990
§ 102(e) Date: May 24, 1990

[87] PCT Pub. No.: WO89/08036
PCT Pub. Date: Sep. 8, 1989

[30] Foreign Application Priority Data

Mar. 2, 1988 [DE] Fed. Rep. of Germany ....... 3806694

[51] Int. Cl.⁵ .............................................. B60R 21/32
[52] U.S. Cl. ..................................... 280/735; 180/274; 180/282
[58] Field of Search ................. 280/734, 735; 180/274, 180/282

[56] References Cited

U.S. PATENT DOCUMENTS

| 3,629,816 | 12/1971 | Gillund ................. 340/61 |
| 3,842,930 | 10/1974 | Fiala ...................... 280/735 |
| 3,874,695 | 4/1975 | Abe et al. .............. 280/150 AB |
| 4,836,024 | 6/1989 | Woehrl et al. ......... 280/735 |
| 4,933,570 | 6/1990 | Swart et al. ........... 280/735 |

FOREIGN PATENT DOCUMENTS

| 156930 | 10/1985 | European Pat. Off. . |
| 2151399 | 5/1972 | Fed. Rep. of Germany . |
| 3116867 | 11/1982 | Fed. Rep. of Germany . |
| 3621580 | 1/1988 | Fed. Rep. of Germany . |

Primary Examiner—Kenneth R. Rice
Attorney, Agent, or Firm—Kenyon & Kenyon

[57] ABSTRACT

An electronic device for protecting the passengers of a motor vehicle during a collision has an acceleration sensor for generating signals indicative of the deceleration of the vehicle. Switching devices are provided to determine whether the collision is a rear-end collision based on the output signals of the sensor. If a rear-end collision is detected, the electronic device prevents the release of one or more restraining devices, such as an airbag, which would not contribute to the protection of the passengers during such a collision.

20 Claims, 3 Drawing Sheets

ELECTRONIC DEVICE

FIELD OF THE INVENTION

The present invention relates to electronic devices and, in particular, to electronic devices for controlling the release of passenger restraint devices, such as airbags, during vehicle collisions.

BACKGROUND INFORMATION

An electronic device for protecting the occupants of a motor vehicle during a collision is shown in German Patent No. DE 3,621,580 Al. Another such device is shown in U.S. Pat. No. 3,874,695, wherein a motor vehicle is equipped with a plurality of restraining devices which are activated as a function of the vehicle's speed. For example, a restraining device allotted to a passenger is activated only at slow vehicle speeds, whereas a restraining device allotted to the driver is not activated at the same speed, or is only activated at a subsequent point in time.

German Patent No. 2,151,399 shows how to install several impact sensitive configurations in a vehicle, wherein several electro-mechanical sensors have sensitivity axes pointing in different directions.

SUMMARY OF THE INVENTION

The present invention is directed to an electronic device for controlling the release of a passenger restraint system on a motor vehicle. The electronic device comprises an acceleration sensor mounted on the vehicle for generating output signals indicative of the acceleration of the vehicle. At least one passenger restraint device is mounted on the vehicle and adapted to be activated during a vehicle collision to protect a passenger in the vehicle. A control unit of the device is coupled to the passenger restraint device and to the acceleration sensor. The control unit is adapted to receive the output signals from the acceleration sensor and to control the release of the passenger restraint device in response thereto. The control unit is further adapted to determine the direction of the force of a collision exerted on the vehicle, and to prevent the release of the restraint device in response thereto.

In one electronic device of the present invention, the control unit includes an integrating unit coupled to the acceleration sensor. The integrating unit includes a first capacitor for integrating the output signals generated by the acceleration sensor. A second capacitor is coupled in parallel relationship with respect to the first capacitor. First means are coupled to the first capacitor and to the second capacitor for monitoring the voltage across the first capacitor. The first means couples the second capacitor to the first capacitor when the voltage across the first capacitor exceeds a threshold value, thus preventing the release of the passenger restraint device.

The first means includes a comparator, wherein the inverting input terminal thereof is coupled to the first capacitor and to the second capacitor. The non-inverting input terminal of the comparator is coupled to a voltage divider. The voltage divider is coupled between ground and the operating voltage of the device, and thus applies a reference voltage to the non-inverting input terminal of the comparator. A first switch is coupled between the output terminal of the comparator and the second capacitor. A second switch is coupled between the output terminal of the comparator and the first capacitor. The comparator is adapted to control the positions of the first and second switches to couple the second capacitor to the first capacitor when the voltage across the first capacitor exceeds a threshold value.

In one electronic device of the present invention, the first means further includes an impedance transformer coupled between the inverting input of the comparator and the first capacitor. The voltage across the first capacitor is applied to the inverting input of the comparator through the impedance transformer.

The present invention is also directed to an electronic device for controlling the release of an airbag on a motor vehicle. The electronic device comprises an acceleration sensor mounted on the vehicle for generating output signals indicative of the acceleration of the vehicle. A control unit is coupled to the airbag and to the acceleration sensor. The control unit is adapted to receive the output signals from the acceleration sensor and to control the release of the airbag in response thereto.

The control unit includes a first capacitor coupled to the acceleration sensor to receive the output signals generated therefrom. The control unit further includes a comparator. The inverting input of the comparator is coupled to the first capacitor. The comparator is adapted to compare the value of the voltage across the first capacitor to a threshold value. A second capacitor is coupled to the inverting input of the comparator and is connected in parallel relationship with respect to the first capacitor. The control unit further includes means for coupling the first capacitor to the second capacitor when the voltage across the first capacitor exceeds the threshold value. The control unit thus prevents the release of the airbag in response to the signals generated by the acceleration sensor.

In one electronic device of the present invention, the means for coupling includes a first switch having a normally open contact coupled between the output of the comparator and the second capacitor. A second switch having a normally closed contact is coupled to the output of the comparator and coupled between the first switch and the first capacitor. The comparator closes the first switch and opens the second switch when the voltage across the first capacitor exceeds a threshold value.

The present invention is also directed to a method of controlling the release of a passenger restraint device on a motor vehicle. The method of the present invention comprises the following steps: generating signals indicative of the acceleration of the vehicle with an acceleration sensor mounted on the vehicle; determining the direction of the force of a collision exerted on the vehicle giving rise to the acceleration signals; and based on the direction of the force, controlling the release of the passenger restraint device in response thereto. Preferably, if the collision exerting the force is a rear-end collision, the passenger restraint device is not released.

It is not practical to activate an airbag during a rear-end collision, since the passengers typically do not move forward during such collisions. Thus, there would likely be no additional protection afforded by an airbag. One advantage of the device of the present invention is that the restraining devices are activated as a function of the direction of the actual forces exerted on the vehicle. Therefore, only the particular restraining devices that can contribute to the protection of the passengers of the vehicle are activated. As a result, the unnecessary activation of restraining devices when they cannot contribute to the protection of the passengers, or when they might endanger the passengers, is avoided.

Other advantages of the present invention will become apparent in view of the following detailed description and drawings taken in connection therewith.

DETAILED DESCRIPTION

Figure 1:
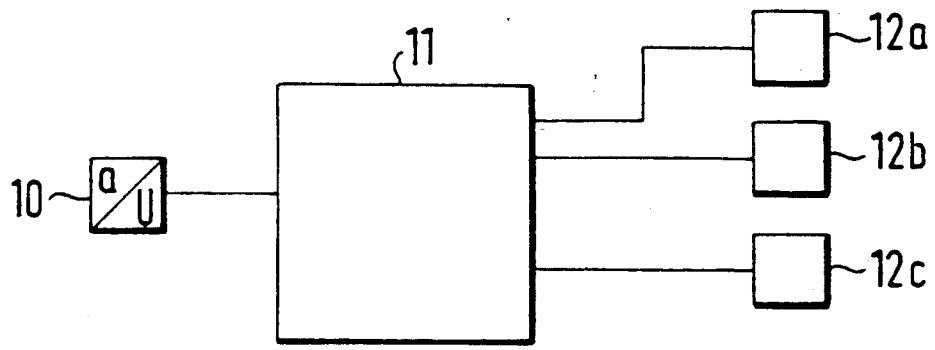
FIG. 1 is a block diagram of an electronic device embodying the present invention.

In FIG. 1, an electronic device embodying the present invention for controlling the release of passenger restraint devices in a motor vehicle (not shown) is illustrated. The electronic device comprises a sensor 10 coupled to a control device 11. The control device 11 is in turn coupled to several restraining devices 12a, 12b and 12c. The restraining devices are, for example, airbags and/or seat belt tighteners, each being allocated to the driver of the vehicle or additional vehicle passengers. An airbag is typically a protective sack which opens in front of the driver or vehicle passengers and is inflated by pressurized gas during a collision. Airbags thus prevent the passengers from being injured during a collision.

The sensor 10 preferably includes a piezoelectric accelerometer which emits a voltage signal indicative of the deceleration of the vehicle. The signal is supplied to the control device 11 which evaluates the signal. If necessary, the control device 11 activates the restraining devices 12a, 12b and/or 12c in response thereto to protect the passengers in the vehicle. The control device 11 comprises devices for distinguishing among various types of collisions, as described in further detail below. For example, the control device 11 can distinguish between a head-on collision, a rear-end collision, and a collision occurring on a side of the vehicle. Based on the type of collision, it will activate one or more of the restraining devices 12a, 12b and/or 12c.

Figure 2:
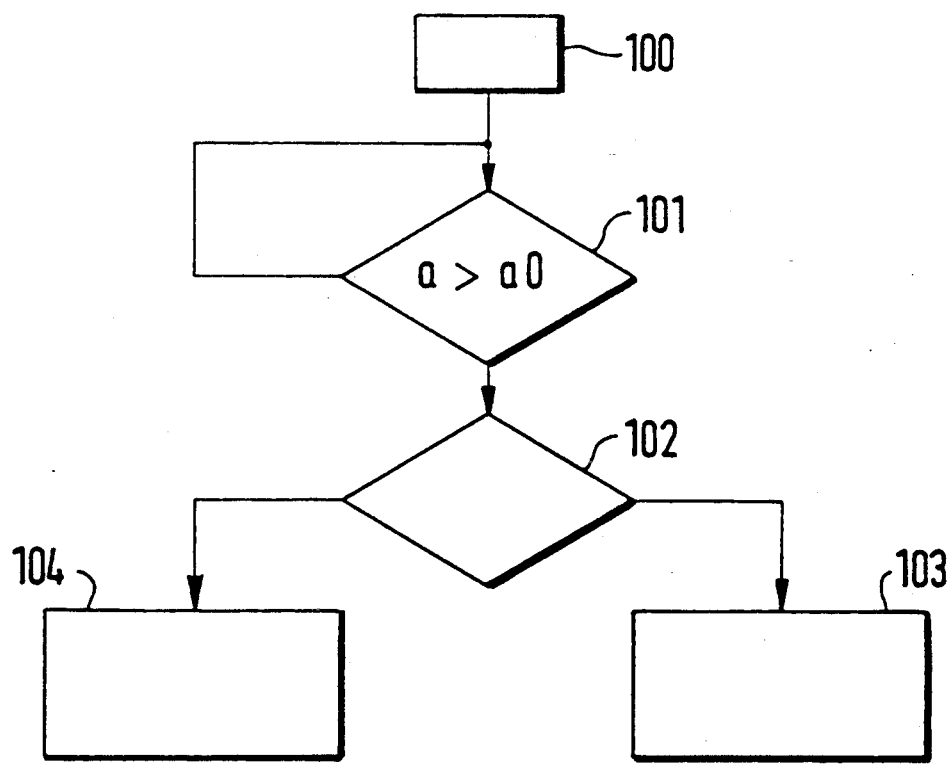
FIG. 2 is a flow chart illustrating conceptually the operational steps of the device of FIG. 1 in accordance with the present invention.

FIG. 2 is a flow chart illustrating conceptually the operational steps of the electronic device embodying the present invention. Sequence step 100 indicates the start of operation. The device constantly checks if the deceleration "a" of the vehicle has reached a limiting value "a0", as indicated by sequence step 101. If the limiting value a0 is reached, the device further checks whether the criterion for a rear-end collision is present, as indicated by sequence step 102. If a rear-end collision is at hand, the device ordinarily does not activate the airbag restraining device, as indicated by sequence step 103. An airbag typically cannot contribute to the protection of the vehicle passengers during such a collision. If the collision is not a rear-end collision, the airbag restraining device ordinarily is also activated, as indicated by sequence step 104.

Figure 3:
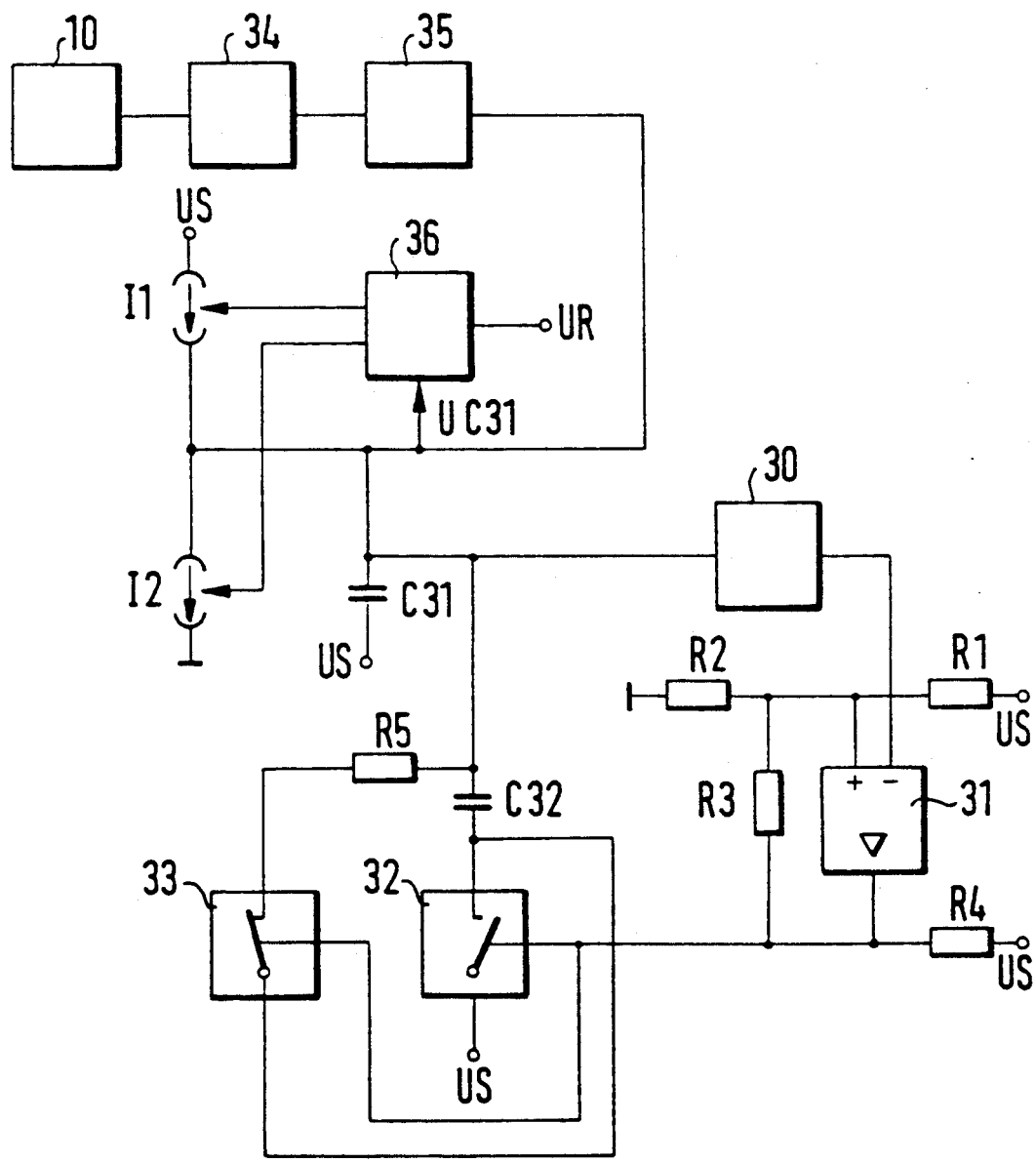
FIG. 3 is a partial, detailed schematic illustrating the device of FIG. 1.
Figure 4A:
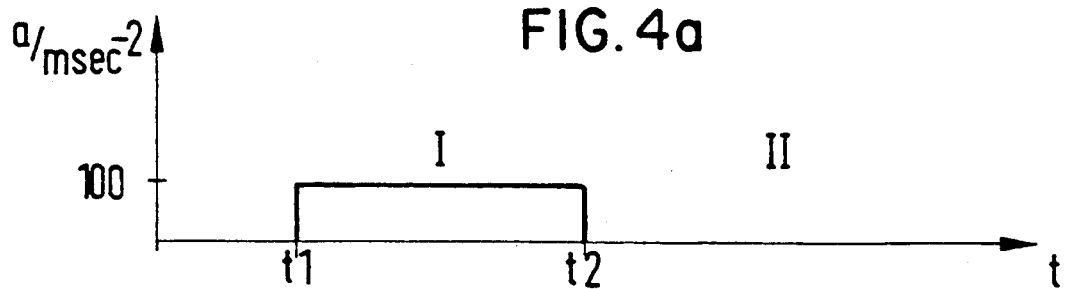
FIG. 4 includes diagrams a-d showing the signal patterns of the device of FIG. 1 generated in response to a rear-end collision.
Figure 4B:
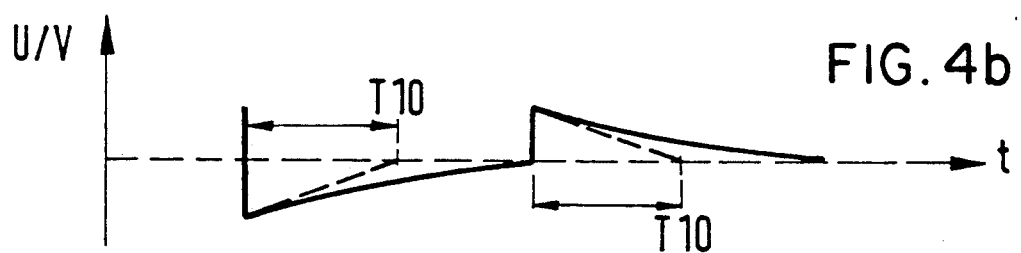
Figure 4C:
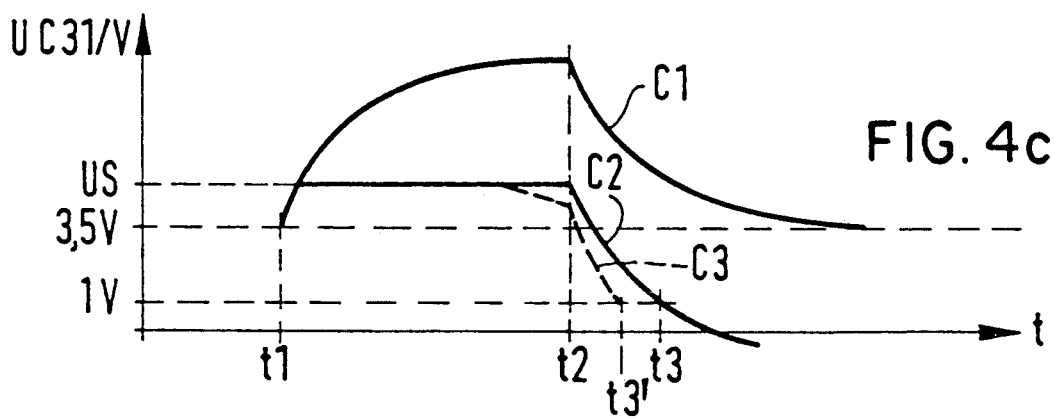
Figure 4D:
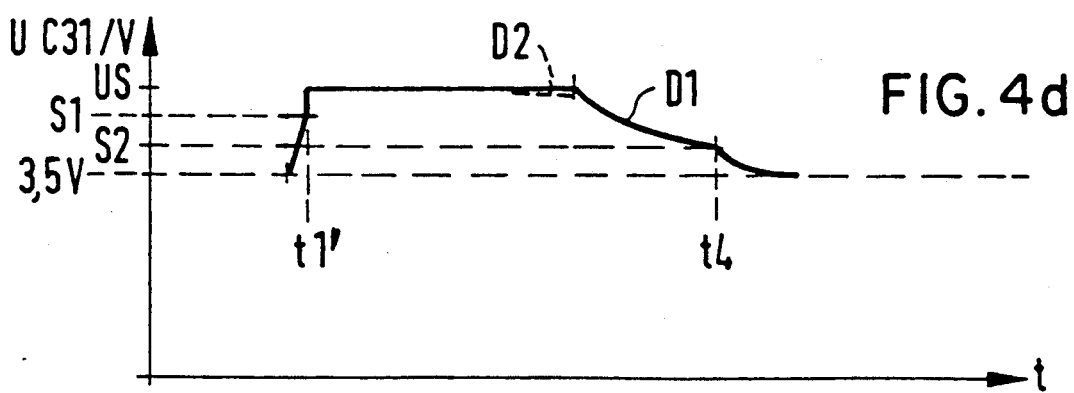

FIG. 3 is a partial circuit diagram of the electronic device of FIG. 1, illustrating the sensor 10 and control device 11 in further detail. The sensor 10 is coupled to an integrator 34 which is in turn coupled to a delimiter 35. The output terminal of the delimiter 35 is coupled on one side to the interconnection point of two current sources 11 and 12. The other terminal of the current source 12 is coupled to ground and the other terminal of the current source 11 is coupled to the operating voltage US. The output terminal of the delimiter 35 is coupled on the other side to a first terminal of an integrating capacitor C31. The second terminal of the integrating capacitor C31 is coupled to the operating voltage US.

A controller 36, which controls the current sources I1 and 12, is coupled through input terminals to a reference voltage UR and the voltage UC31 across the integrating capacitor C31. The input terminal of an impedance transformer 30 is coupled to the first terminal of the integrating capacitor C31, which turns away from the operating voltage source US. The output terminal of the impedance transformer 30 is coupled to the inverting input terminal of a comparator 31.

The non-inverting input terminal of the comparator 31 is coupled to the pick-off of a voltage divider R1, R2. The resistors R1 and R2 are coupled between ground and the operating voltage US. The first terminal of a resistor R3 is coupled to the pick-off of the voltage divider R1, R2. The second terminal of the resistor R3 is coupled to the output terminal of the comparator 31, which is in turn coupled to the operating voltage US via a resistor R4.

A first switch 32 and second switch 33 are each coupled to and controlled by the output terminal of the comparator 31. A first terminal of the first switch 32 is coupled to the input terminal of the impedance transformer 30 via a capacitor C32. The second terminal of the first switch 32 is coupled to the operating voltage US. The first terminal of the second switch 33 is coupled to the input terminal of the impedance transformer 30 via a resistor R5. The second terminal of the second switch 33 is coupled to the first terminal of the first switch 32, which is in turn coupled to the input terminal of the impedance transformer 30 via the capacitor C32. As shown in FIG. 3, the first switch 32 has a normally open contact, whereas the second switch 33 has a normally closed contact.

The operation of the electronic device of the present invention is hereinafter described with reference to the diagrams of FIG. 4, wherein each pulse shape is plotted as a function of time. The diagrams a-d of FIG. 4 exhibit specific signal shapes in two time ranges, 1 and 11. Time range 1 corresponds to the time interval t1-t2, during which a decelerating force acts upon the vehicle, as shown in diagram a. Accordingly, the deceleration, represented by the pulse in diagram a (shown in an idealized shape), acts upon the sensor 10. The deceleration acting upon the sensor 10 is represented in diagram a as a square-wave signal, beginning at instant t1 and ending at instant t2.

Diagram b shows the output signal generated by the sensor 10 in response to the deceleration pulse shown in diagram a. The signal corresponds to the deceleration of the vehicle and thus the physical progression of the rear-end collision in the time range I. The shape of the curve in diagram b is a function of the frequency limit of the sensor 10. The high pass time constant of the sensor 10 is indicated as T10.

Diagram c illustrates the output voltage of the integrator 34 generated in response to the output signal of the sensor 10 shown in diagram b. Curve C1 therefore represents the voltage UC31 across the integrating capacitor C31. Beginning at a resting level of approximately 3.5 volts, the integration curve C1 climbs in the opposite direction as would be the case, for example, of the response to a head-on collision requiring a release of an airbag. During time range II, the output signal of the sensor 10, as shown in diagram b, indicates a deceleration of the vehicle. Therefore, if one were in a position to provide the voltage range necessary for a smooth integration, it would not result in a release of the restraining devices 12a, 12b and/or 12c.

In order for the integration process to proceed in the release direction with accuracy, 50% or more of the available stabilized supply voltage is provided for this integrating range. As a practical matter, however, the integration curve C1 of diagram c is not feasible, since five to ten times the voltage, as compared to the voltage in the case of a head-on collision, would be required. In the latter case, a voltage within the range of approximately 10 to 20 volts would appear.

In the event of a rear-end collision, the electronic device of the present invention typically has an integrating progression which follows the curve C2 shown in diagram c. However, at most, with the presence of an internal deceleration threshold, a progression of the integration curve according to the dash-dot curve C3 in diagram c is achieved. During the transition from time range I to time range II, the electronic device would release the restraining devices at the instant t3 or t3'.

The voltage UC31 across the integrating capacitor C31, is observed via the impedance transformer 30, as shown by the circuit diagram of FIG. 3. If this voltage exceeds the threshold S1, as shown in diagram d, then the presence of a rear-end collision is determined. The voltage threshold S1 is set by the resistor combination R1, R2, R3 and R4. If the threshold S1 is exceeded, the first switch 32 is closed by the comparator 31, and the second switch 33 is opened. As a result, the voltage at the integrating capacitor C31 is raised to the value US at instant t1', as indicated in diagram d. The voltage across the integrating capacitor C31 remains at the value US throughout time range I. It then drops slightly at the end of time range I, as indicated by the dash-dot line D2 in diagram d due to the existing internal current source 12 (the deceleration threshold).

Because of the parallel connection of the capacitor C32 and the integrating capacitor C31, the dis-integration begins in time range II, as indicated by the curve D1 in diagram d. The integration coefficient is determined by the parallel-coupled capacitors C31 and C32. A threshold S2 for the voltage UC31 across the integrating capacitor C31 is defined by the resistor R3 coupled to the comparator 31. When the voltage UC31 falls below the threshold S2, the capacitor C32 is disabled by the comparator 31 by opening the first switch 32 and by closing the second switch 33.

As will be recognized by those skilled in the art, by changing the integration coefficients by means of the parallel coupled capacitor C32, the release of the restraining devices can be avoided during a rear-end collision. The electronic device of the present invention then continues to operate with the integration time optimized for a head-on collision after the capacitor C32 is disabled at instant t4, as shown in diagram d.

With the electronic device of the present invention, there have not been any observed disadvantageous effects on the release behavior of the restraining devices during a head-on collision. Known electronic devices with quartz sensors or piezoelectric sensors for detecting deceleration, on the other hand, have no particular protection against an undesirable release during a rear-end collision. Other solutions to this problem have included the use of a sensor with an extremely low bottom frequency limit. However, this is technologically very difficult to achieve, as well requiring a large voltage range for integration. The electronic device of the present invention, on the other hand, provides a feasible solution to the problem of preventing the release of a passenger restraint device during a rear-end collision with relatively simple switching devices and with substantial accuracy.

As will be further recognized by those skilled in the art, the ability to protect against the undesirable release of the passenger restraint devices during a rear-end collision can be optimally adapted to certain vehicle conditions. For example, a rear-end collision can be detected according to mathematical simulations, by simply varying the switching thresholds S1 and S2, shown in diagram d, as well as by adapting the integration coefficient by selecting a particularly suitable value for the capacitor C32.

We claim:

1. An electronic device for controlling the release of a passenger restraint system on a motor vehicle, comprising:
    an acceleration sensor mounted on the vehicle for generating output signals indicative of the acceleration of the vehicle;
    at least one passenger restraint device mounted on the vehicle and adapted to be activated during a vehicle collision to protect a passenger in the vehicle;
    a control unit coupled to the passenger restraint device and to the acceleration sensor, the control unit being adapted to receive the output signals from the acceleration sensor and to control the release of the passenger restraint device in response thereto, the control unit being further adapted to determine the direction of the force of a collision exerted on the vehicle, and to prevent the release of the restraint device in response thereto, the control unit including
        an integrating unit coupled to the acceleration sensor for generating integrated signals based on the output signals generated by the acceleration sensor, and
        first means for comparing the integrated signals to a threshold voltage indicative of a rear-end vehicle collision for preventing the release of the restraint device if an integrated signal exceeds the threshold voltage.

2. An electronic device as defined in claim 1, wherein the integrating unit includes a first capacitor; and the device further includes
    a second capacitor coupled in parallel relationship with respect to the first capacitor; and
    second means coupled to the first capacitor and the second capacitor for monitoring the voltage across the first capacitor and for coupling the second capacitor to the first capacitor when the voltage across the first capacitor exceeds a threshold value.

3. An electronic device as defined in claim 2, wherein the second means includes
    a comparator, the inverting input terminal thereof being coupled to the first capacitor and to the second capacitor, the non-inverting input terminal thereof being coupled to a voltage divider, the voltage divider being coupled between ground and the operating voltage of the device, and thus applying a reference voltage to the non-inverting input terminal of the comparator;

a first switch coupled between the output terminal of the comparator and the second capacitor;

a second switch coupled between the output terminal of the comparator and the first capacitor, the comparator being adapted to control the positions of the first and second switches to couple the second capacitor to the first capacitor when the voltage across the first capacitor exceeds a threshold value.

4. An electronic device as defined in claim 3, wherein the second means further includes an impedance transformer coupled between the inverting input of the comparator and the first capacitor, the voltage across the first capacitor being applied to the inverting input of the comparator through the impedance transformer.

5. An electronic device for controlling the release of a passenger restraint system on a motor vehicle, comprising:

an acceleration sensor mounted on the vehicle for generating output signals indicative of the acceleration of the vehicle;

at least one passenger restrain device mounted on the vehicle for activation during a vehicle collision to protect a passenger in the vehicle;

a control unit coupled to the passenger restraint device and to the acceleration sensor for receiving the output signals from the acceleration sensor and controlling the release of the passenger restraint device in response thereto, and determining the direction of the force of a collision exerted on the vehicle, the control unit including an integrating unit coupled to the acceleration sensor, the integrating unit including a first capacitor for integrating the output signals generated by the acceleration sensor;

a second capacitor coupled in parallel with the first capacitor; and first means coupled to the first capacitor and the second capacitor for monitoring the voltage across the first capacitor and for coupling the second capacitor to the first capacitor when the voltage across the first capacitor exceeds a threshold value to prevent the release of the passenger restraint device based on the direction of the force of a collision.

6. An electronic device as defined in claim 5, wherein the first means includes a comparator including an inverting input terminal coupled to the first capacitor and to the second capacitor, and a non-inverting input terminal coupled to a voltage divider, the voltage divider being coupled between ground and the operating voltage of the device, and thus applying a reference voltage to the non-inverting input terminal of the comparator;

a first switch coupled between the output terminal of the comparator and the second capacitor; and a second switch coupled between the output terminal of the comparator and the first capacitor, wherein the comparator controls the positions of the first and second switches to couple the second capacitor to the first capacitor when the voltage across the first capacitor exceeds a threshold value.

7. An electronic device as defined in claim 6, wherein the first means further includes an impedance transformer coupled between the inverting input of the comparator and the first capacitor, the voltage across the first capacitor being applied to the inverting input of the comparator through the impedance transformer.

8. A method of controlling the release of a passenger restraint device on a motor vehicle, comprising the following steps:

generating signals indicative of the acceleration of the vehicle with an acceleration sensor mounted on the vehicle;

determining the direction of the force of a collision exerted on the vehicle giving rise to the acceleration signals for controlling the release of the passenger restraint device based on the direction of the force;

integrating the signals generated by the acceleration sensor with an integrating capacitor;

applying the voltage across the integrating capacitor to the inverting input terminal of a comparator;

applying a reference voltage to the non-inverting input terminal of the comparator;

comparing the voltage across the integrating capacitor to a threshold voltage; and when the voltage across the integrating capacitor exceeds the threshold voltage, coupling another capacitor in parallel with the integrating capacitor to prevent the release of the passenger restraint device based on the direction of the force.

9. An electronic device for controlling the release of a passenger restraint system on a motor vehicle, comprising:

an acceleration sensor mounted on the vehicle for generating output signals indicative of the acceleration of the vehicle;

at least one passenger restraint device mounted on the vehicle for activation during a vehicle collision to protect a passenger in the vehicle;

a control unit coupled to the passenger restraint device and to the acceleration sensor for controlling the release of the passenger restraint device in response to the output signals transmitted by the acceleration sensor, the control unit including an integrating unit coupled to the acceleration sensor, the integrating unit including a first capacitor for integrating the output signals transmitted by the acceleration sensor, and a second capacitor for coupling to the first capacitor to prevent the release of the passenger restraint device based on the direction of the force of a collision.

10. An electronic device as defined in claim 9, wherein the second capacitor is coupled in parallel with the first capacitor; and the control unit further includes means coupled to the first capacitor and the second capacitor for monitoring the voltage across the first capacitor and for coupling the second capacitor to the first capacitor when the voltage across the first capacitor exceeds a threshold value.

11. A method of controlling the release of a passenger restraint device on a motor vehicle, comprising the following steps:

generating signals indicative of the acceleration of the vehicle with an acceleration sensor mounted on the vehicle;

determining the direction of the force of a collision exerted on the vehicle giving rise to the acceleration signals;

integrating the signals generated by the acceleration sensor with an integrating capacitor; and coupling a second capacitor to the integrating capacitor to prevent the release of the passenger restraint device based on the direction of the force.

12. A method as defined in claim 11, wherein if the collision exerting the force is a rear-end collision, the passenger restraint device is not released.

13. A method as defined in claim 11, further comprising the following steps:

applying the voltage across the integrating capacitor to the inverting input terminal of a comparator;

applying a reference voltage to the non-inverting input terminal of the comparator;

comparing the voltage across the integrating capacitor to a threshold voltage; and when the voltage across the integrating capacitor exceeds the threshold voltage, coupling the second capacitor in parallel with the integrating capacitor.

14. An electronic device for controlling the activation of a passenger restraint device on a motor vehicle, comprising:

an acceleration sensor mounted on the vehicle for generating output signals indicative of the acceleration of the vehicle;

a passenger restrains device mounted on the vehicle and adapted to be activated during a collision to protect a passenger in the vehicle;

a control unit coupled to the passenger restraint device and to the acceleration sensor, the control unit being adapted to receive the output signals from the acceleration sensor and to control the activation of the passenger restraint device in response thereto, the control unit including an integrator coupled to the acceleration sensor for receiving the output signals therefrom and for generating output signals in response thereto, a first capacitor coupled to the integrator for integrating the output signals generated therefrom, a second capacitor coupled in parallel relationship with respect to the first capacitor, a comparator, the inverting input terminal thereof being coupled to the first capacitor and to the second capacitor, a voltage divider coupled to the non-inverting input terminal of the comparator and supplying a reference voltage thereto, a first switch coupled between the output terminal of the comparator and the second capacitor, a second switch coupled to the output terminal of the comparator and coupled between the first switch and the first capacitor, the comparator being adapted to compare the value of the voltage across the first capacitor to a threshold voltage value, and when the voltage across the first capacitor exceeds the threshold value, to close the first switch and open the second switch and thus couple the second capacitor to the first capacitor, thus preventing the activation of the passenger restraint device.

15. An electronic device as defined in claim 14, wherein the control unit further comprises:

an impedance transformer coupled between the inverting input terminal of the comparator and the first capacitor, the voltage across the capacitor being applied to the comparator through the impedance transformer.

16. An electronic device for controlling the release of an airbag on a motor vehicle, comprising:

an acceleration sensor mounted on the vehicle for generating output signals indicative of the acceleration of the vehicle;

a control unit coupled to the airbag and to the acceleration sensor, the control unit being adapted to receive the output signals from the acceleration sensor and to control the release of the airbag in response thereto, the control unit including a first capacitor coupled to the acceleration sensor to receive the output signals generated therefrom, a comparator, the inverting input thereof being coupled to the first capacitor, the comparator being adapted to compare the value of the voltage across the first capacitor to a threshold value, a second capacitor coupled to the inverting input of the comparator and connected in a parallel relationship with respect to the first capacitor, and means for coupling the first capacitor to the second capacitor when the voltage across the first capacitor exceeds the threshold value, to prevent the release of the airbag in response to the signals generated by the acceleration sensor.

17. An electronic device as defined in claim 16, wherein the means for coupling includes a first switch having a normally open contact coupled between the output of the comparator and the second capacitor, and a second switch having a normally closed contact coupled to the output of the comparator and coupled between the first switch and the first capacitor, wherein the comparator closes the first switch and opens the second switch when the voltage across the first capacitor exceeds the threshold value.

18. An electronic device as defined in claim 17, wherein the control unit further includes a voltage divider coupled to the non-inverting input of the comparator and applying a reference voltage thereto; and an impedance transformer coupled between the first capacitor and the inverting input of the comparator, the voltage across the first capacitor being applied to the comparator through the impedance transformer.

19. A method of controlling the release of a passenger restraint device on a motor vehicle, comprising the following steps:

generating signals indicative of the acceleration of the vehicle with an acceleration sensor mounted on the vehicle;

determining the direction of the force of a collision exerted on the vehicle giving rise to the acceleration signals;

integrating the signals generated by the acceleration sensor with an integrating capacitor; and comparing the voltage across the integrating capacitor to a threshold value indicative of a rear-end vehicle collision, and prevent the release of the restraint device if the voltage across the integrating capacitor exceeds the threshold value.

20. A method as defined in claim 19, further comprising the following steps:

applying the voltage across the integrating capacitor to the inverting input terminal of a comparator;

applying a threshold voltage to the non-inverting input terminal of the comparator; and when the voltage across the integrating capacitor exceeds the threshold voltage, coupling another capacitor in parallel relationship with the integrating capacitor.

* * * * *

UNITED STATES PATENT AND TRADEMARK OFFICE
CERTIFICATE OF CORRECTION

PATENT NO. : 5,129,673

DATED : July 14, 1992

INVENTOR(S) : Mattes et al.

It is certified that error appears in the above-indentified patent and that said Letters Patent is hereby corrected as shown below:

Column 4    line 3, change "11 and 12" to --I1 and I2--;
line 4, change "12" to --I2--;
line 5, change "11" to --I1--;
line 11, change "12" to --I2--;

Column 5    line 4, 26 and 46, change "11" to --I1--;
line 43, change "12" to --I2--;

Column 9    line 29, change "restrains" to --restraint--;

Column 10,   line 66, change "prevent" to --prevents--.

Signed and Sealed this

Twenty-fourth Day of May, 1994

Attest:

BRUCE LEHMAN

*Attesting Officer*     *Commissioner of Patents and Trademarks*